United States Patent [19]

Bilz

[11] Patent Number: 5,248,229
[45] Date of Patent: Sep. 28, 1993

[54] CHUCK FOR TOOL, ESPECIALLY DRILLING TOOL

[75] Inventor: Reiner Bilz, Esslingen, Fed. Rep. of Germany

[73] Assignee: Otto Bilz, Werkzeugfabrick GmbH & Co., Ostfildern, Fed. Rep. of Germany

[21] Appl. No.: 879,786

[22] Filed: May 6, 1992

[51] Int. Cl.⁵ .............................................. B23B 49/00
[52] U.S. Cl. ........................................ 408/16; 408/6
[58] Field of Search ............... 408/616, 238, 9, 11; 279/4.02, 126, 157

[56] References Cited

U.S. PATENT DOCUMENTS

| 4,090,802 | 5/1978 | Bilz ........................................ 408/6 |
| 4,425,060 | 1/1984 | Bilz et al. ............................... 408/6 |

FOREIGN PATENT DOCUMENTS

| 0229399 | 7/1987 | European Pat. Off. . |
| 2650095 | 5/1978 | Fed. Rep. of Germany . |
| 61-88015 | 5/1986 | Japan . |
| 62-54652 | 3/1987 | Japan . |
| 3-1111171 | 5/1991 | Japan . |

*Primary Examiner*—Daniel W. Howell
*Attorney, Agent, or Firm*—Michael J. Striker

[57] ABSTRACT

A chuck for a tool, particularly a drilling tool has a shaft receivable in a machine spindle, a sleeve arranged for receiving a fast exchange insert with a tool or directly a tool, a longitudinal compensation device connecting the sleeve with the shaft and reacting to a relative axial displacement of the shaft and the sleeve, a signal device provided with a current source, a signal transmitter and a switch which is axially displaceable between the shaft and the sleeve and arranged in a current supply circuit of the signal transmitter, at least a part of which transmitter is arranged outside and peripherally of the shaft, and an outer ring holder which surrounds the shaft and carries the signal device together with the current source, the signal transmitter and the switch.

46 Claims, 3 Drawing Sheets

CHUCK FOR TOOL, ESPECIALLY DRILLING TOOL

BACKGROUND OF THE INVENTION

The present invention relates to a chuck for a tool, especially a drilling tool.

A chuck is disclosed for example in German document DE-OS 3,046,485 in which a signal device is provided and formed as a high frequency transmitting device with a current source, a high frequency transmitter and a switch in a current supply circuit of the high frequency transmitter. The high frequency transmitting device also has, as a part of the signal transmitter an outer antenna ring. With the exception of this antenna ring, all other components of the high frequency transmitting device including the parts which act on the switch are arranged in the interior of the hollow shaft. However, the outer antenna ring as a part of the signal transmitter is located outside and peripherally of the shaft. The arrangement of the components of the signal device, with the exception of the outwardly located parts of the signal transmitter, in the interior of the hollow shaft, has the advantage that they are reliably protected. However, it also possesses some disadvantages. This arrangement in the interior of the hollow shaft leads to a complicated construction, and also in the case of repair the elements in the interior of the shaft are not easily accessible. Also, the outer diameter of the shaft and thereby the outer diameter of the chuck cannot be reduced below a predetermined value due to the parts located in its interior. This is of disadvantage for example when such a chuck must be used in multispindle drilling machines with relatively small spindle distances. Also, the signal device itself has a relatively expensive construction.

SUMMARY OF THE INVENTION

Accordingly, it is an object of the present invention to provide a chuck for a tool, which avoids the disadvantages of the prior art.

More particularly, it is an object of the present invention to provide such a chuck which has a simple and inexpensive construction, and in which the outer diameter of the chuck can be further reduced when needed.

In keeping with these objects and with others which will become apparent hereinafter, one feature of the present invention resides, briefly stated, in a chuck of the above mentioned general type in which an outer ring holder which surrounds the shaft is provided, and the ring holder supports the whole signal device including the current source, the whole signal transmitter and the switch.

The whole signal device is located therefore outside so that the interior of the shaft remains free. Therefore, it is possible when needed to reduce the outer diameter of the shaft and thereby the diameter of the chuck further and thereby to provide a chuck with smaller outer diameters. Due to the arrangement of the elements of the signal device outside the shaft, the chuck is substantially simpler and less expensive. The signal device with its elements is also designed simpler, more compact and therefore less expensive. For adjusting purposes, maintenance or repair works the signal device with its individual components is easily accessible from outside. Also, the signal device can be mounted fast and simple. Then the ring holder which supports the whole signal device with all its elements can be separately premounted before remaining parts of the chuck so that the whole ring can be fitted as a complete unit on the shaft and then connected with the shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
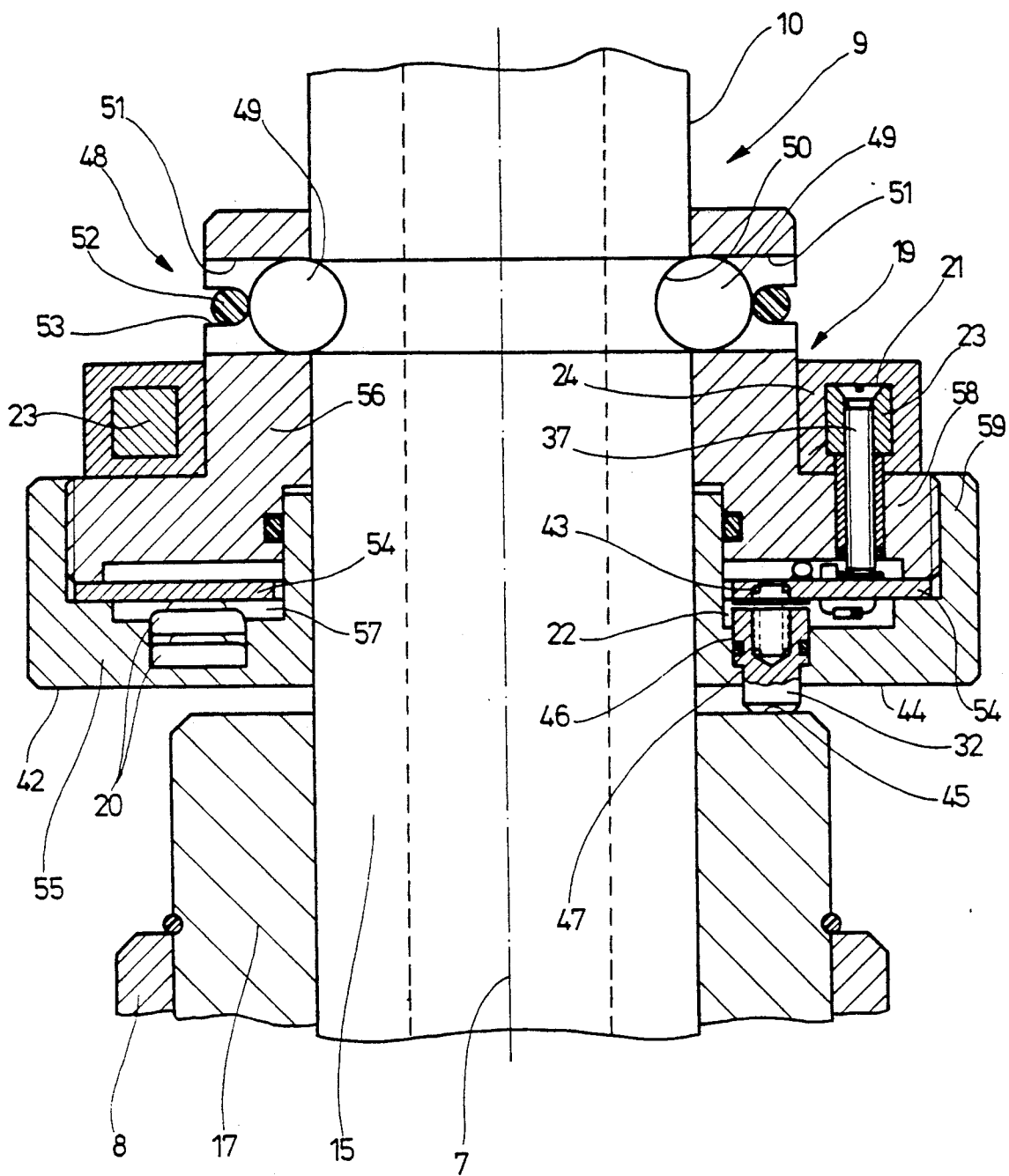
FIG. 1 is a view schematically showing an axial longitudinal section of a part of a chuck, especially for a drilling tool, in accordance with a first embodiment of the invention.

A chuck shown in FIG. 1 is identified with reference numeral 9 and illustrated with the exception of components of a signal device which will be described hereinbelow, such as for example shown in the German document DE-OS 3,046,485. For avoiding unnecessary repetitions and descriptions of structural elements of the chuck 9, the above specified German document and its description are incorporated here by means of a reference thereto.

The chuck 9 has a shaft 10, of which in FIG. 1 a lower part 15 is shown. The upper part of the shaft 10, which is formed for example as an adjusting sleeve with an inner hollow space and receivable in the interior of a machine spindle is not shown in the drawing. The lower part 15 of the shaft 10 is inserted in a sleeve 17, and a cover sleeve 8 is arranged axially immovably on the sleeve 17. In accordance with the German document DE-OS 3,046,485 the sleeve 17 on the not shown lower end serves either for directly receiving a tool for example a thread drill, or for receiving a fast exchange insert which in turn contains the tool for example a thread drill.

The shaft 10 which is driven by the not shown machine spindle is connected with the sleeve 17 by a not shown longitudinal compensating device which reacts to an axial relative displacement of the shaft 10 and the sleeve 17 and permits such a relative displacement. Since the shaft 10 is received in the machine spindle, therefore during the relative displacement the sleeve 17 starting from the initial position of FIG. 1 is displaced in direction of the longitudinal center axis 7 upwardly further onto the shaft.

The chuck 9 is provided with a signal device 19 which includes a current source 20 for example in form of several batteries, a signal transmitter 21 and a switch 22 in a current supply circuit of the signal transmitter 21. The switch 22 is closeable by an axial relative displacement between the shaft 10 and the sleeve 17, starting from the initial position which corresponds to the switch opening position. Therefore the signal transmitter 21 can be supplied with voltage and activated.

As in the German document DE-OS 3,046,485, during response of the not shown longitudinal compensation device in the signal device 18, an electrical circuit is closed and the signal transmitter 21 produces a signal and outputs the same. The signal can be received by a not shown, stationary receiver and evaluated. Therefore, a signal is produced during the reaction of the longitudinal compensating device. The longitudinal compensating device reacts in the event of exceeding a predetermined displacement force, which occurs in the case of a dull drill or openings which are not sufficiently deeply drilled or clogged drill openings for example by chips or other disturbances. A corresponding signal is produced due to the resulting compression of the longitudinal compensating device, and it signals a reaction of the safety device. The outputted signal is detected for example by a stationary receiving device and transmitted further as an error information for example to an associated control unit. This operation is disclosed in detail in the German document DE-OS 3,046,485 for a high frequency transmitting device, in order to avoid repetition it is incorporated here by means of a reference.

In accordance with the novel features of the present invention, the shaft 10 of the chuck 9 has a ring holder 52 which surrounds the shaft from outside and supports the total signal device 19 together with the current source 20, the signal transmitter 21 and the switch 21.

The thusly designed ring holder 42 is fittable as a finished functional assembly onto the shaft 10. In the chuck shown in FIG. 1, the switch 22 has a switching plunger 32 which is displaceable against a spring 43. As can be seen, the switch 22 is arranged outside of the shaft 10. Its switching plunger 32 is loaded and acted upon during the axial relative displacement between the shaft 10 and the sleeve 17 or in other words, during reaction of the above described longitudinal compensating device directly by means of the sleeve 17 and therefore in the axial direction. The switch 22 is held on the ring holder 42 in a direction substantially parallel to its longitudinal central axis 7. The switching plunger 32 is arranged on the axial side 44 of the ring holder 42, which faces the sleeve 17. The switching plunger 32 projects forwardly at its axial side 44 from the ring holder 42 so far that during the reaction of the longitudinal compensating device it can be loaded and acted upon directly. In other words, it is acted upon without intermediate elements, by an axial end side 45 of the sleeve 17, which faces the switching plunger 32. The switch 22 is held in a substantially axis-parallel receptacle 46 in the interior of the ring holder 42 so that the switching plunger 32 with its end extends in a substantially axis-parallel direction outwardly beyond the ring holder 42. The receptacle 46 has a ring shoulder 47 which prevents pulling out of the switching plunger 32 downwardly in FIG. 1 and therefore its falling out.

The ring holder 42 is supported axially displaceably on the shaft 10 within at least certain limits. The ring holder 42 is secured in the axial initial position shown in FIG. 1 which with respect to the switch 22 corresponds to the opening position of the switch. The securing of this axial initial position of the ring holder 42 is provided by an arresting device 48 which is arrestable by an axial force which exceeds its holding force. In the first embodiment of the invention, in FIG. 1 the arresting device 48 can be formed as a notch pressure amplifier. The arresting device 48 has at least one ball 49 which is held in the ring holder 42. It engages substantially radially into a ring depression 50, for example a ring shaped groove, provided on the outer side of the shaft 10 and is spring-biased into the ring depression 50. In the first embodiment of FIG. 1 several balls 49 are provided. They are held for example at substantially equal angular distances from one another in a peripheral direction for example in substantially radial openings 51 of the ring holder 42. The balls 49 are radially inwardly pressed by a spring ring 52. The ring extends substantially concentrically to the shaft 10 and engages the balls 49 from outside. The ring holder 42 can have a peripheral groove 53 of a sufficient depth for passing the spring ring 52. In this manner, the the balls 49 are simply mountable and secured by the outwardly engaging spring ring 52, and moreover pretensioned in the radial direction inwardly in a spring-elastic manner, so that they are pressed into the ring depression 50.

In the first embodiment of FIG. 1 the signal device 19 is formed analogously to the high frequency transmitting device of the German document DE-OS 3,046,485. Its signal transmitter 21 has a high frequency transmitter arranged in the ring holder 42 and an outer antenna ring 23 mounted on the outer side of the ring holder 42. The antenna ring 23 is covered around with a protective casing 24 and mounted on the ring holder 42 for example by means of electrically conductive screws 37. The screws 37 extend substantially parallel to the longitudinal central axis 7. The signal transmitter 21 which is designed here as high frequency transmitter has a transmitter plate 54 arranged in the interior of the ring holder 42 and provided with structural elements required for the high frequency transmitting device.

The ring holder 42 is composed of two axially assembled ring parts 55 and 56. A ring chamber 57 is formed between the ring parts 55 and 56 and is sealed from outside. The upper ring part 56 shown in FIG. 1 is stepped so as for example to form a radially projecting collar 58. The antenna ring 23 is arranged in the region of this step. The other ring part 56 is substantially cup-shaped outwardly and engages with a cylindrical edge 59 of the collar 58. In this region the edge 59 can be screwed with an inner thread on an outer thread of the collar 58. The high frequency transmitter, especially the transmitter plate 54 is arranged in the ring chamber 57 located between the ring parts 55 and 56 and therefore protected. A part of the transmitter plate 54 associated with the facing end of the switching plunger 32 forms together with this end of the switching plunger 32 a switch 52. The transmitter plate 54 is fixed with its outer edge between both ring parts 55 and 56 of the ring holder 42. In the first embodiment shown in FIG. 1 not only the switch 22 and its plunger 32 with a spring 43 but also the current source 20 is located in the ring part 55 in a peripherally offset arrangement. The current source 22 can include for example several batteries which are held in electrically conductive connection with the transmitter plate 54. The arresting device 48 with the balls 49 in the openings 51 and with the spring ring 52 are located in the other upper ring part 56 in FIG. 1.

When the not shown longitudinal compensation device reacts when a predetermined displacement force is exceeded, the shaft 10 is displaced further into the sleeve 17 and thereby the sleeve 17 is displaced upwardly relative to the shaft 10 in FIG. 1. Therefore, by the end surface 45 of the sleeve 17, the switching plunger 32 is displaced upwardly against the action of the spring 43. The switch 22 is closed. Thereby the electrical circuit of the signal device 19 formed as the high frequency transmitting device is closed and a high frequency signal is produced and outputted. The output is performed through the antenna ring 23. The high frequency signal is received by a not shown stationary high frequency receiver and evaluated as described in the German document DE-OS 3,046,485.

Since the total signal device 19 with all components is arranged on the outer ring holder 42 which surrounds the shaft 10, a substantial simplification and cost reduction is obtained. The ring holder 42 and the signal device 19 can be premounted and then mounted on the shaft fast and simple. Also, respective repair works or an exchange of the signal device 10 by another device can be executed fast and simple.

When the longitudinal compensation device reacts, the signal device 19 is turned on and the corresponding signal is outputted, the axial force taken up by the switching plunger 32 and the transmitter plate 54 and activated during the relative displacement between the shaft 10 and the sleeve 7 is limited by the arresting device 48. If this axial force exceeds the holding force of the arresting device 48, the balls 49 are pressed against the action of the spring ring 52 radially outwardly, so that they are disengaged from the ring depression 50 of the shaft 10. The arresting device 48 formed as a notch pressure amplifier can simultaneously limit the cutting pressure during drilling or thread cutting to an upper value.

Figure 2:
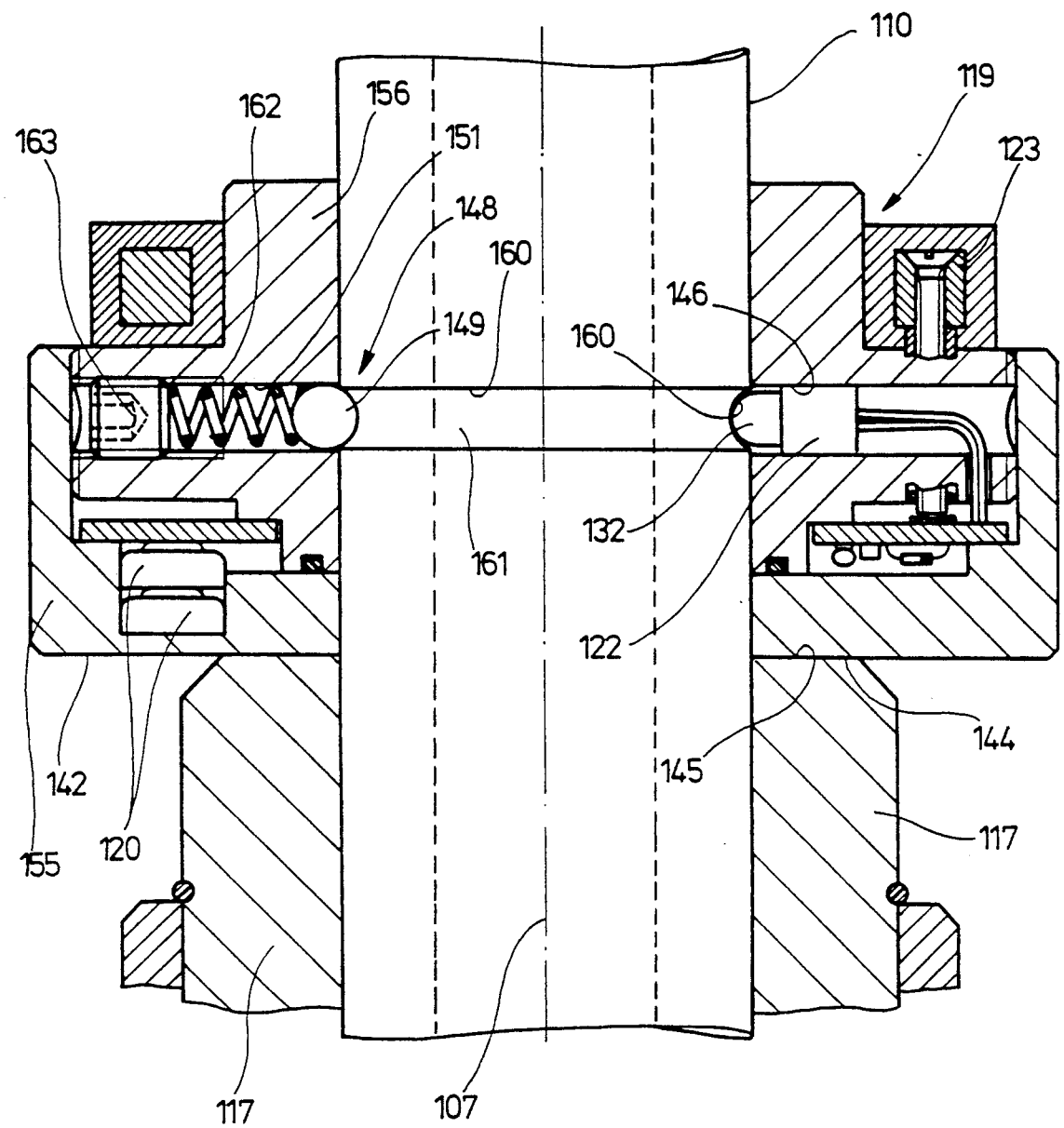
FIG. 2 is a view schematically showing an axial longitudinal section of a chuck in accordance with a second embodiment of the invention.

In the second embodiment shown in FIG. 2 the parts which correspond to the parts of the first embodiment are identified with reference numerals which are higher by 100. Therefore, the repetition of the description of the first embodiment can be avoided.

In the second embodiment of FIG. 2 the ring holder 42 is designed substantially as in the first embodiment. The signal device 119 has the same components as in FIG. 1 and is also designed as a high frequency transmitting device. A difference resides in the arrangement and construction of the switch 122. In the second embodiment the switching plunger 132 of the switch 122 arranged outside the shaft 110 is not loaded and acted upon directly during the axial relative displacement between the shaft 110 and the sleeve 117 as in the first embodiment. Instead, it is loaded and acted upon indirectly by means of the sleeve 117. The switching plunger 132 is arranged transversely to the longitudinal central axis 107 of the shaft 110 and is loadable and acted upon. The receptacle 146 in the ring holder 142 for the switch 122 is arranged transverse to the longitudinal central axis 107 in particular substantially radially so that the switching plunger 132 is oriented substantially radially. Therefore the switching plunger 132 is in a form-locking abutment contact with a substantially radial projection 160 of the shaft 110, when the switching plunger 132 assumes the initial position shown in FIG. 2 which corresponds to the opening position of the switch. This substantially radial projection 160 of the shaft 110 is formed by a ring shoulder on the shaft 110. The switching plunger 132 abuts against the ring shoulder, and during the axial relative displacement of the switching plunger 132 to the closing position of the switch is overrun. In a simple manner this radial projection 160 with the radial shoulder is formed by a ring depression 161, for example a ring groove on an outer side of the shaft. The switching plunger 132 can engage with its free end into the ring depression in the shown initial position.

The switch 122 is arranged in a substantially radial receptacle 146 of the ring holder 142 and fixed so that the switching plunger 132 with its end extends in a radial direction outwardly beyond the ring holder 142 and engages in the ring depression 161. Due to this design the substantially radially extending switching plunger 132 is displaceable in the closing direction of the switch by the axial direction of the ring holder 142 which is performed directly by means of the sleeve 117. This relative axial displacement is provided in that the ring holder 142 with its axial side 144 facing the sleeve 117 strikes directly against the facing axial end face 145 of the sleeve 117, and due to this can be axially displaced relative to the shaft 110 in FIG. 2. This axial support of the ring holder 142 on the shaft 110 makes possible the axial displacement at least within certain limits.

In the second embodiment the ring holder 132 is also secured on the shaft 110 in the shown axial initial position by means of an arresting device 148 which is arrestable by an axial force which exceeds its holding force. The arresting device 148 has at least one ball 149 which is held in an opening 151 in the ring holder 142. The ball 149 engages substantially radially in the ring depression 161 on the outer side of the shaft 110 and pressed spring-elastically by means of a spring 162 into the ring depression 161. The ring depression 161 in which at least one ball 149 engages serves as the depression in which, as considered in the peripheral direction, the switching plunger 132 engages in its initial position. The at least one opening 151 with the ball 149 in it and the receptacle 146 with the switch 122 in it are arranged on the same peripheral circle in the ring holder 142. This reduces the manufacturing cost. The spring which acts on the ball 149 and is also retained in the opening 151 is supported with its end facing away of the ball 149 against an adjustable abutment 163. The abutment can be composed for example from a threaded pin, a screw or the like engaging in the opening 151.

The signal device 119 is also formed as a high frequency transmitting device similarly to the first embodiment. It has the same above described components.

In deviation from the first embodiment, the current source 120 is located in the second embodiment in the lower ring part 155 and composed for example of several batteries. The switch 122 and the arresting device 147 are accommodated in the other upper ring part 156 of the ring holder 142 which as in the embodiment of FIG. 1 also carries the antenna ring 123. The receptacle 146 for the switch 122 can be composed of a radial opening in the ring part 156. The radial opening can be as big as the opening 151 in which the ball 149 with the spring 162 and the abutment 163 are contained. It is to be understood that in the peripheral direction also several openings 151 with the balls 149 and respective components can be provided. Due to this construction the ring switch 142 especially its upper ring part 156 is particularly simple, since its production especially the production of the receptacle 146 and the opening 141 is therefore simplified.

Figure 3:
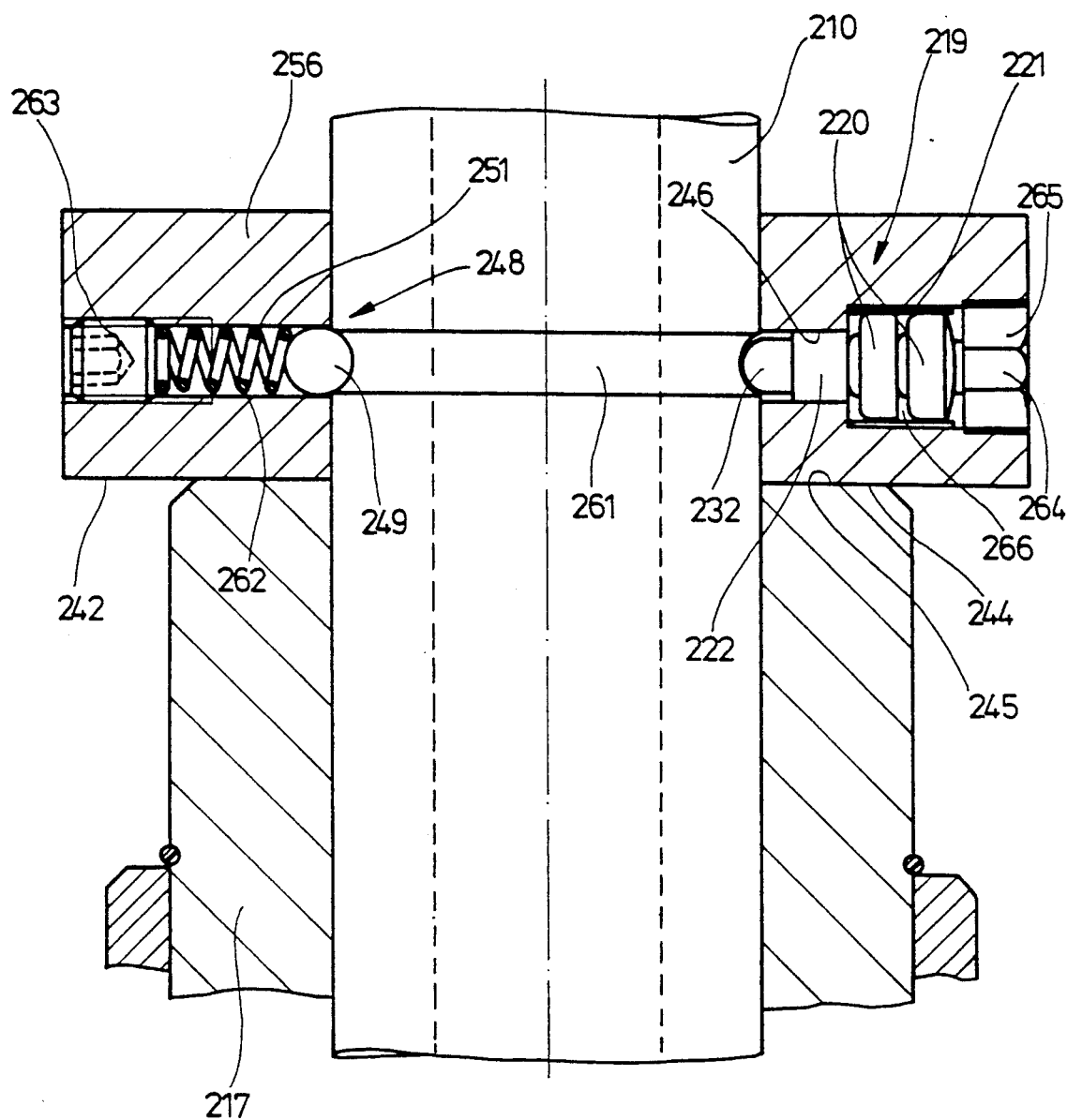
FIG. 3 is a view schematically showing an axial longitudinal section of a chuck in accordance with a third embodiment of the invention.

In the third embodiment shown in FIG. 3 the parts which correspond to the parts of the first and/or second embodiments are provided with reference numerals which are by 200 greater. Therefore repetition of the description of the previous embodiments can be avoided.

In the third embodiment of FIG. 3 the ring holder 242 is composed of a single ring 256 which accommodates a switch 222 with the radially directed switching plunger 233 in a substantially radial recess 246 analogously to FIG. 2. The switching plunger 233 engages the outer side of the shaft 210 in a form-locking manner, analogously to FIG. 2, into a ring depression 261 formed for example as a ring groove.

Similarly to the second embodiment of FIG. 2 the ring holder 242 is provided on the same peripheral circuit with an arresting device 248 which designed similarly to the embodiment of FIG. 2. The arresting device 248 has at least one ball 249 inside a substantially radial opening 251. The ball 249 is pressed by a spring 262 in the ring depression 261. The spring 262 abuts with its end facing away of the ball 249 against an abutment 263 which for example is composed of a threaded pin screwed in a threaded part of the opening 251. As in FIG. 2, during reaction of the safety device of the chuck the axial side 244 of the ring holder 242 strikes against the facing end face 245 of the sleeve 217. The ring holder 242 is displaced by the direct engagement of the sleeve 217 during this relative displacement relative to the shaft 210. As in the second embodiment of FIG. 2, the arresting device 244 is arrested by this axial force, or in other words this axial force exceeds the holding force of the arresting device 248.

In contrast to the preceding embodiments, in the second embodiment of FIG. 3 the signal device 219 is formed as an infrared-transmitting device. Its signal transmitter 221 has at least one infrared light diode 264 which is held by a screw 265. A chamber 266 which for example is in alignment with the receptacle 246 and provided between the switch 222 and the light diode 264, the current source 220 which can be composed for example of several batteries are arranged in the single ring part 256. Such a signal device 219 is especially simple, light and inexpensive with respect to its infrared-transmitting device. It requires only a few batteries, namely the switch 222, the current source 220 and at least one infrared light diode 264 which can be mounted from one side into the substantially radial receptacle 246 and the chamber 266 of the ring part 256.

In another, not shown embodiment the arrangement is provided as in the first embodiment of FIG. 1. The ring holder corresponds exactly to the ring holder 42 in FIG. 1 and is provided with the arresting device 48, for example a cut pressure amplifier. However, in this not shown embodiment the signal device is formed not as a high frequency transmitting device of FIG. 1, but instead as a infrared transmitting device. When compared with FIG. 1, the signal transmitter 21 with the antenna ring 23 and their mounting are omitted. The switch 22 is however arranged and designed in the same way as in FIG. 1. The infrared transmitting device has at least one infrared light light diode similar to the diode in FIG. 3 which radiates outwardly and, coming from the first embodiment in FIG. 1, is arranged on the ring part 55. Instead of the transmitter plate 54 shown in FIG. 1, in the initial position with an infrared transmitting device a plate which supports the elements is provided, and the axially directed switch 22 as well as further at least one infrared light diode is connected with it.

In another not shown embodiment the arrangement is provided in correspondence with FIG. 2, however, the high frequency transmitting device is dispensed with and replaced with an infrared-transmitting device. Also, when compared with FIG. 2, the antenna ring 123 with the protective casing 124 and the screws 137 are dispensed with. Due to this, with the ring part 156 of the ring holder 142 in FIG. 2, the upwardly directed cylindrical part which surrounds the shaft 110 can be dispensed with so that starting from FIG. 2 the ring part 156 practically can be formed as a disc. This disc analogously to FIG. 2 is provided with the arresting device 148 and the substantially radial receptacle 146 in which a substantially radial switch 122 can be arranged in correspondence with FIG. 2. Both the at least one ball 149 and also the switching plunger 132 are engaged in the same ring depression 131 of the shaft 110. Instead of the transmitter plate 154 of FIG. 2, an electronic plate can be provided at substantially the same location and can support the elements of the infrared transmitting device and connected with the switch. The infrared transmitting device has a substantially radially oriented infrared light diode which is contained in the ring part 155 when connected with the electronic plate.

It will be understood that each of the elements described above, or two or more together, may also find a useful application in other types of constructions differing from the types described above.

While the invention has been illustrated and described as embodied in a chuck for a tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims.

I claim:

1. A chuck for a tool, particularly a drilling tool, comprising a shaft receivable in a machine spindle; a sleeve arranged for receiving a fast exchange insert with a tool or directly a tool; a longitudinal compensation device connecting said sleeve with said shaft and reacting to a relative axial displacement of said shaft and said sleeve; and a signal device provided with a current source, a signal transmitter and a switch which is axially displaceable between said shaft and said sleeve and arranged in a current supply circuit of said signal transmitter, at least a part of said signal transmitter being arranged outside and peripherally of said shaft; and an outer ring holder which surrounds said shaft and carries said signal device together with said current source, said signal transmitter and said switch.

2. A chuck as defined in claim 1, wherein said switch is arranged outside said shaft and has a switching plunger which during an axial relative displacement between said shaft and said sleeve is loadable and actuatable by said sleeve.

3. A chuck as defined in claim 2, wherein said switching plunger is directly loadable and actuatable by said sleeve.

4. A chuck as defined in claim 2, wherein said switching plunger is indirectly loadable and actuatable by said sleeve.

5. A chuck as defined in claim 1, wherein said switch has a switching plunger which is loadable and actuatable by said sleeve in an axial direction.

6. A chuck as defined in claim 1, wherein said shaft has a longitudinal central axis, said switch being held on said ring holder in a direction substantially parallel to said longitudinal central axis of said shaft, said switch having a switching plunger which is arranged on an axial side of said ring holder which faces said sleeve.

7. A chuck as defined in claim 1, wherein said switch has a switching plunger which extends outwardly beyond said ring holder and is loadable and actuatable by an an axial end surface of the sleeve which faces said switching plunger.

8. A chuck as defined in claim 1, wherein said shaft has a longitudinal central axis, said switch having a switching plunger which is loadable and actuatable transverse to said longitudinal central axis of said shaft.

9. A chuck as defined in claim 8, wherein said shaft has a substantially radial projection, said switch being held on said ring holder in a direction extending transverse to said longitudinal central axis of said shaft, said switching plunger being in a form-locking abutment contact with said projection of said shaft.

10. A chuck as defined in claim 9, wherein said switch is oriented in a substantially radial direction relative to said longitudinal central axis of said shaft.

11. A chuck as defined in claim 9, wherein said projection of said shaft is formed as a ring shoulder on said shaft, said switching plunger abutting against said ring shoulder and is transferable during an axial relative displacement of said switching plunger with displacement of said switching plunger to a closing position of said switch.

12. A chuck as defined in claim 1, wherein said shaft has an outer side provided with a ring depression, said switch having a switching plunger which in its initial position corresponding to an opening position of said switch engages with its free end into said ring depression.

13. A chuck as defined in claim 12, wherein said ring depression is formed as a groove.

14. A chuck as defined in claim 1, wherein said ring holder has a recess, said switch being arranged in said recess of said ring holder and having a switching plunger with an end extending outwardly beyond said ring holder.

15. A chuck as defined in claim 14, wherein said recess is substantially axis-parallel with said switch, said switching plunger extending outwardly beyond said ring holder in substantially axis-parallel manner.

16. A chuck as defined in claim 14, wherein said recess is substantially radial with said switch, said switching plunger extending outwardly beyond said ring holder in substantially radial manner.

17. A chuck as defined in claim 14, wherein said switching plunger extends substantially radially and is displaceable to a closing position of said switch by an axial displacement of said ring holder performed directly by means of said sleeve.

18. A chuck as defined in claim 17, wherein said sleeve has an axial end face facing said ring holder, said ring holder being directly loadable and displaceable by said axial end face of said sleeve.

19. A chuck as defined in claim 1, wherein said ring holder is axially displaceable on said shaft at least within limits.

20. A chuck as defined in claim 1, wherein said sleeve is loadable in an axial direction so as to perform an axial relative displacement between said shaft and said sleeve.

21. A chuck as defined in claim 1, wherein said ring holder is secured on said shaft in an axial initial position.

22. A chuck as defined in claim 21; and further comprising an arresting device which secures said axial initial position of said ring holder and is arrestable by an axial force which exceeds its holding force.

23. A chuck as defined in claim 22, wherein said arresting device is formed as a cut pressure amplifier.

24. A chuck as defined in claim 22, wherein said arresting device includes a ring depression provided on an outer side of said shaft, and at least one ball which is held in said ring holder and engages substantially radially in said ring depression and is also spring-elastically pressed into said ring depression.

25. A chuck as defined in claim 24, wherein said ring depression is formed as a groove provided on said outer side of said shaft.

26. A chuck as defined in claim 24, wherein said switch has a switching plunger which in its initial position engages also in said ring depression.

27. A chuck as defined in claim 24; and further comprising a spring ring which is substantially concentrical to said shaft and engages said ball from outside so as to inwardly press said ball.

28. A chuck as defined in claim 24, wherein said ring holder has a substantially radial opening, said ball being formed in said opening; and further comprising a spring which is arranged in said opening and acts on said ball and also has an opposite end, and an adjustable abutment against which said opposite end of said spring is supported.

29. A chuck as defined in claim 28, wherein said adjustable abutment is formed as a threaded pin engageable in said opening.

30. A chuck as defined in claim 23, wherein said ring holder has at least one opening and a substantially radial receptacle, said arresting device having a ball arranged in said opening, said switch being arranged in said receptacle, said opening and said receptacle being arranged on the same peripheral circle in said ring holder.

31. A chuck as defined in claim 1, wherein said signal device is formed as a high frequency transmitting device with said signal transmitter as a high frequency transmitter and arranged in said ring holder, said signal device also having an outer antenna ring mounted on an outer side of said ring holder.

32. A chuck as defined in claim 31; and further comprising a protective casing which covers said outer antenna ring and isolates it.

33. A chuck as defined in claim 31, wherein said outer antenna ring is mounted on said ring holder; and further comprising means for mounting said antenna ring on said ring holder.

34. A chuck as defined in claim 33, wherein said mounting means are formed as electrically conductive screws.

35. A chuck as defined in claim 31, wherein said high frequency transmitter has a transmitter plate arranged in an interior of said ring holder.

36. A chuck as defined in claim 1, wherein said signal device is formed as an infrared transmitting device with said signal transmitter having at least one infrared light diode.

37. A chuck as defined in claim 1, wherein said ring holder includes two axially assembled ring parts.

38. A chuck as defined in claim 37, wherein at least one of said switch and said current source is located in one of said ring parts.

39. A chuck as defined in claim 38, wherein said current source includes batteries.

40. A chuck as defined in claim 38, wherein both said switch and said current source are located in said one ring part.

41. A chuck as defined in claim 38; and further comprising an arresting device which secures an axial initial position of said ring holder, at least one of said arresting device and said switch is arranged in another of said ring parts.

42. A chuck as defined in claim 41, wherein both said arresting device and said switch are located in said another ring part.

43. A chuck as defined in claim 37, wherein said ring parts form a ring chamber therebetween, said signal device is formed as a high frequency transmitting device with said signal transmitter formed as a high frequency transmitter, said high frequency transmitter being arranged in said ring chamber.

44. A chuck as defined in claim 43, wherein said high frequency transmitter has a transmitter plate arranged in said ring chamber.

45. A chuck as defined in claim 1, wherein said ring holder is formed as a single ring with substantially radial openings; and further comprising an arresting device for arresting said ring holder in its initial position, said arresting device and said signal device being arranged in said radial openings.

46. A chuck as defined in claim 45, wherein said current source includes batteries, said signal transmitter is an infrared signal transmitter, said batteries, said switch, said infrared signal transmitter of said signal device being arranged in a respective one of said radial openings.

* * * * *